United States Patent
Schmierer

(10) Patent No.: US 6,173,873 B1
(45) Date of Patent: Jan. 16, 2001

(54) ARRANGEMENT FOR HOLDING A SUITCASE ON A MOTOR VEHICLE HOOD

(75) Inventor: Wolfgang Schmierer, Pforzheim (DE)

(73) Assignee: Dr. Ing. h.c.F. Porsche AG, Weissach (DE)

( * ) Notice: Under 35 U.S.C. 154(b), the term of this patent shall be extended for 0 days.

(21) Appl. No.: 09/321,215

(22) Filed: May 27, 1999

(30) Foreign Application Priority Data

May 27, 1998 (DE) .............................................. 198 25 401

(51) Int. Cl.[7] ...................................................... B60R 9/00
(52) U.S. Cl. .................... 224/328; 224/309; 224/326; 224/547
(58) Field of Search .................... 224/309, 325, 224/326, 328, 428–431, 547

(56) References Cited

U.S. PATENT DOCUMENTS

| | | |
|---|---|---|
| 3,565,305 | 2/1971 | Belokin, Jr. . |
| 3,907,184 * | 9/1975 | Zane et al. ........................ 224/326 X |
| 4,274,568 | 6/1981 | Bott . |
| 4,274,569 * | 6/1981 | Winter et al. ..................... 224/328 X |
| 4,387,840 | 6/1983 | Popeney . |
| 4,406,387 * | 9/1983 | Rasor ................................... 224/328 |
| 5,375,748 * | 12/1994 | Katz .................................. 224/431 X |
| 5,653,366 * | 8/1997 | Liserre .............................. 224/431 X |

FOREIGN PATENT DOCUMENTS

| | | | |
|---|---|---|---|
| 724639 * | 7/1942 | (DE) | .................................. 224/32 A |
| 43 43 093 | 6/1995 | (DE) . | |
| 297 16 252 U | 10/1997 | (DE) . | |

* cited by examiner

Primary Examiner—Gregory M. Vidovich
(74) Attorney, Agent, or Firm—Evenson, McKeown, Edwards & Lenahan, P.L.L.C.

(57) ABSTRACT

An arrangement for receiving a suitcase on a vehicle hood, particularly a rear opening hood of a motor vehicle, comprises at least three fastening elements arranged on a hood surface which are connected by way of fastening devices with support parts of the rear opening hood. Two of the fastening elements are arranged in a transverse plane and—relative to the driving direction—close to a forward hood edge, and another fastening element is arranged close to a rearward hood edge in a longitudinal center plane of the vehicle.

6 Claims, 3 Drawing Sheets

ARRANGEMENT FOR HOLDING A SUITCASE ON A MOTOR VEHICLE HOOD

BACKGROUND AND SUMMARY OF THE INVENTION

This application claims the priority of German Application No. 198 25 401.6, filed May 27, 1998, the disclosure of which is expressly incorporated by reference herein.

The invention relates to an arrangement for receiving or holding a suitcase on a hood of a motor vehicle, particularly a rear opening hood of a motor vehicle.

U.S. Pat. No. 3,565,305 discloses a known receiving arrangement for a suitcase on a rear opening hood of a motor vehicle. Arranged on the bottom of the suitcase are supporting elements directed toward the hood. The supporting elements are connected with a belt strap which stretches around the rear opening hood, and the suitcase is thereby fastened on the rear opening hood.

It is an object of the invention to provide an improved receiving device for a suitcase on a rear opening hood of a motor vehicle which ensures a simple handling for placing, removing and fixing the suitcase.

According to the present invention, this object is achieved by an arrangement for receiving a suitcase on a vehicle hood, particularly a rear opening hood of a motor vehicle. The arrangement comprises at least three fastening elements arranged on a hood surface, which are connected by way of further fastening elements with support parts of the rear opening hood. Two fastening elements are arranged in a transverse plane and—relative to the driving direction—close to a forward hood edge. Another fastening element is arranged close to a rearward hood edge in a longitudinal center plane of the vehicle. Additional advantageous characteristics are described herein.

The principal advantages achieved by the present invention are that, by means of three fastening elements, a suitcase can be placed in an easy manner on the rear opening hood of a motor vehicle, can be deposited on the hood and can be brought into a locked position.

The fastening elements can be connected with the rear opening hood via screws or similar holding devices, at least one screw or the like respectively being used for the fastening elements which are situated in the front—relative to the driving direction. For the support with respect to an interior hood stay, a supporting plate is provided which comprises sleeves in which the screws are arranged. Therefore, distortion of the hood stay as well as of the hood is prevented.

These fastening elements are constructed such that one locking plate respectively on the suitcase bottom can reach under these elements by means of a so-called sliding-in. For this purpose, the suitcase bottom is provided with so-called threading-in channels which are arranged to correspond with the fastening elements and, in a holding position, the bases of the fastening elements are placed on the supporting surfaces of the fastening elements.

For the reaching-under, the fastening elements have projecting detent noses and, with respect to the supporting surface, at least one stepped side flank. It is also contemplated that only the exterior side flanks of the fastening elements are stepped.

The rearward fastening element is constructed as a bow and, after the suitcase has been placed on the hood, locking parts reach over and under so that a firm hold is ensured.

Preferably, the forward fastening elements consist of two support and detent segments and the rearward fastening element consists of a bow segment. According to experience, the arrangement of the segments can also be such that the two fastening elements are arranged in the rear and the one bow segment is arranged in the front.

Other objects, advantages and novel features of the present invention will become apparent from the following detailed description of the invention when considered in conjunction with the accompanying drawings.

DETAILED DESCRIPTION OF THE DRAWINGS

Figure 1:
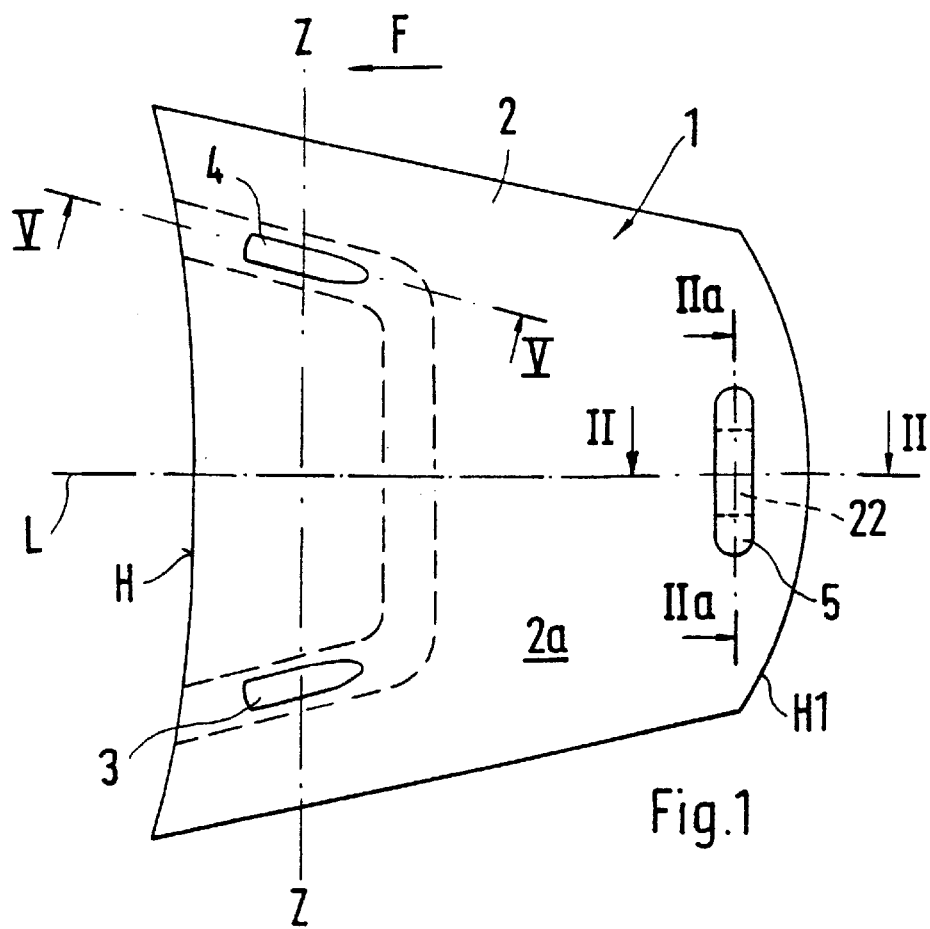
FIG. 1 is a top view of a rear opening hood with three fastening elements.
Figure 2:
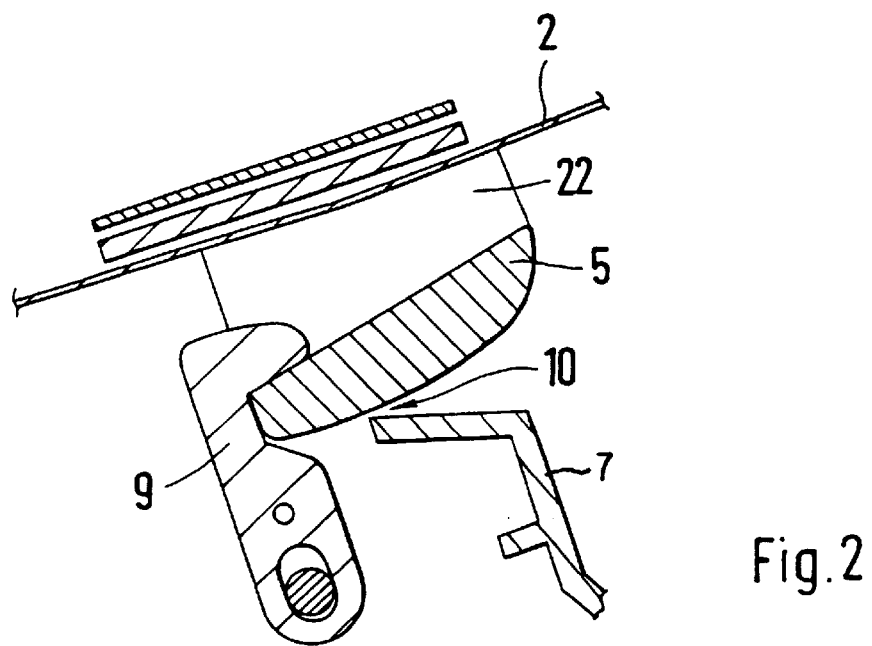
FIG. 2 is a longitudinal sectional view of a fastening element situated in the rear according to Line II—II of FIG. 1, along with locking parts of a suitcase mounted thereon.
Figure 2A:
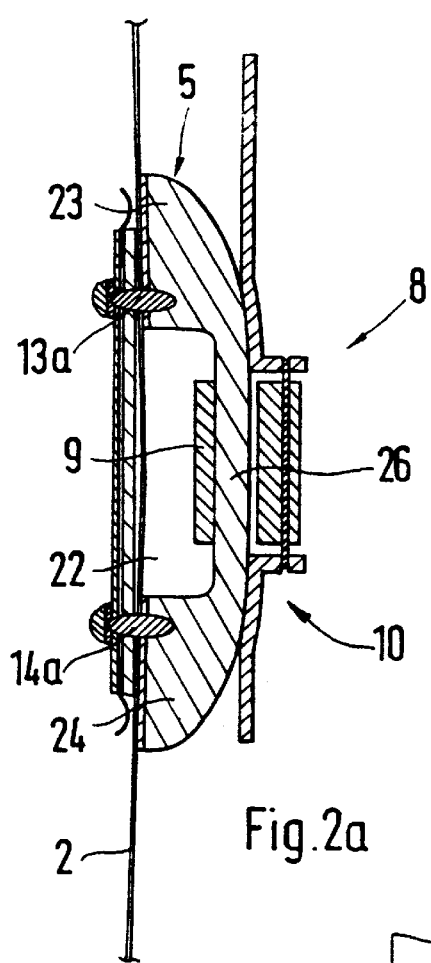
FIG. 2a is a detailed cross-sectional view according to Line IIa—IIa of FIG. 1 of the fastening element situated in the rear, along with locking parts of a suitcase mounted thereon.

The receiving or holding arrangement 1 for a suitcase on a rear opening hood 2 of a motor vehicle takes place through the use of a three-point fastening system which—relative to the driving direction F—has two fastening elements 3, 4 arranged in the front in a transverse plane Z—Z close to a forward hood edge H, and a single fastening element 5 situated in the rear close to a rearward hood edge H1 and aligned along a longitudinal center plane L of the vehicle. As shown in FIGS. 3–6, the fastening elements 3, 4 situated in the front engage with corresponding locking plates 6, 6a of a suitcase 7. As shown in FIG. 2a, the fastening element 5 situated in the rear is engaged by way of locking parts 9, 10 situated on the suitcase 7, particularly with a locking bar 9 and a lock support 10 that form a locking and fixing device.

The fastening elements 3, 4 each consist of oblong segments having a detent nose 11 situated to face rearwardly (FIG. 5) and at least one laterally stepped surface 12 on at least one lateral flank of the element 3, 4.

Each fastening element 3, 4 is connected with the hood 2 by means of screws 13, 14 which are supported on a hood stay 15. For this purpose, the screws 13, 14 are held in a support plate 16 to which sleeves 17, 18 are molded for receiving the screws. The sleeves 17, 18 bridge the distance "a" between the hood stay 15 and the hood 2. Simultaneously, by way of the spacing sleeves 17, 18, a deformation of the hood stay 15 as well as of the hood 2 is provided when the screws 13, 14 are tightened.

Figure 3:
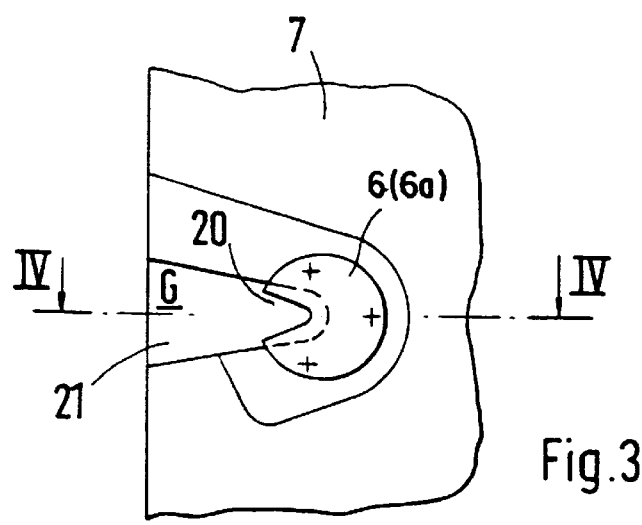
FIG. 3 is a bottom view of a suitcase with a locking plate and a thread-in channel.
Figure 4:
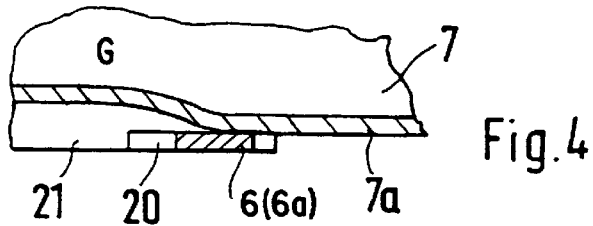
FIG. 4 is a sectional view according to Line IV—IV of FIG. 3.
Figure 5:
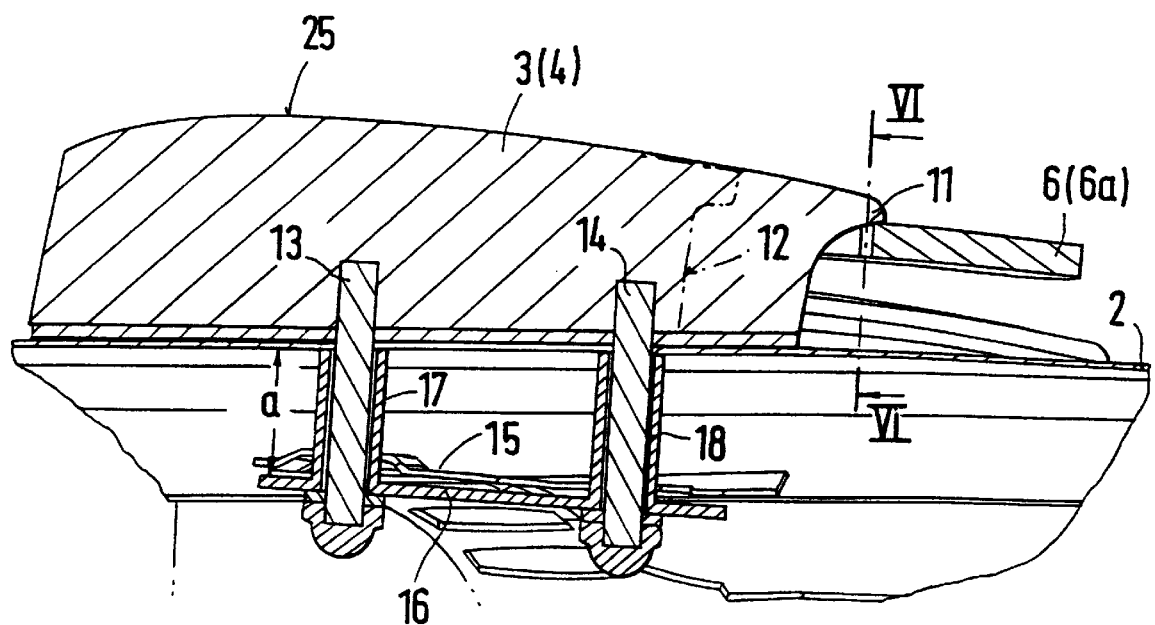
FIG. 5 is a longitudinal sectional view of the fastening element situated in the front according to Line V—V of FIG. 1.
Figure 6:
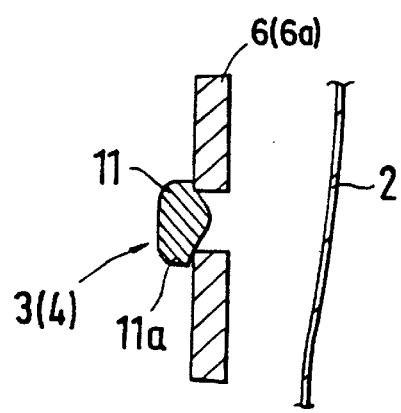
FIG. 6 is a cross-sectional view according to Line VI—VI of FIG. 5 of the detent nose of the fastening element and the locking plate of the suitcase.

For hooking the suitcase 7 onto the fastening elements 3, 4, locking plates 6, 6a are provided on the bottom 7a of the suitcase (FIGS. 3 and 4). These locking plates 6, 6a each have a slot 20 which, on the end side, has an insertion channel 21 molded into the suitcase bottom 7a. The locking plate 6, 6a reaches around the detent nose 11 and the supporting surface 25 of the fastening element 3, 4 during the hooking-in operation, as illustrated in FIG. 6. The base G of the channel 21 rests on the supporting surface 25 of the fastening element 3, 4.

The fastening element 5 situated in the rear consists essentially of a part which is constructed in a bridge or bow shape and has an opening 22 and lateral bearing shoulders 23, 24 (FIG. 2a). These bearing shoulders 23, 24 are supported on the hood 2 and can be connected with the hood 2 by means of screws 13a, 14a or the like.

The locking bar 9 of the suitcase lock and the lock support 10 are used for fixing and locking the suitcase 7. The two locking elements 9 and 10 firmly grip from above and below around the bridge 26 of the fastening element 5.

The placing of the suitcase 7 onto the hood takes place by threading the locking plate 6, 6a into the fastening elements 3, 4 situated in the front. Subsequently, the suitcase is placed onto the additional fastening element 5 arranged in the rear in the longitudinal center axis L of the vehicle. The operation of the lock mechanism 9, 10 causes a locking of the suitcase 7 in the fastening element 5 so that a fixed, detachable connection is ensured with this fastening element 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle hood fastening arrangement for use with a suitcase, the arrangement comprising:

a vehicle hood having a hood surface with a forward and rearward hood edge with respect to a longitudinal direction of a vehicle;

at least three fastening elements arranged on the hood surface, two of said fastening elements being in a transverse plane close to the forward hood edge, and another of said fastening elements being in a longitudinal center plane close to the rearward hood edge;

said two fastening elements having an oblong segment shape with an outer supporting surface and a detent nose, said detent nose pointing in a direction substantially opposite a forward driving direction of the vehicle, each oblong segment shaped fastening element having at least one lateral flank including an inwardly directed step surface with respect to the outer supporting surface;

said another fastening element arranged close to the rearward hood edge having a bow-shape, a bridge portion of said bow-shaped fastening element forming an opening between the bridge portion and the vehicle hood;

a corresponding fastening system arrangeable on a surface of the suitcase, said corresponding fastening system comprising two locking plates respectively engaging said detente nose and said lateral flank of said two fastening elements close to the forward hood edge and locking parts engaging said another fastening element, said locking parts comprising a locking bar, which reaches under said bridge from a forward location relative to the forward driving direction, and a lock support extending over said bridge from above.

2. The arrangement according to claim 1, wherein the fasteners for said at least two fastening elements arranged close to the forward hood edge comprise two screws and a support plate, wherein the support plate comprises two spacing sleeves in which said screws are arranged, said spacing sleeves bridging a distance from the support plate to a hood surface.

3. The arrangement according to claim 1, wherein in a holding condition of the suitcase on the vehicle hood, said at least two fastening elements engage with said respective locking plates, each locking plate reaching under a corresponding detent nose of the fastening element and at least one lateral area of the stepped surface.

4. The arrangement according to claim 2, wherein in a holding condition of the suitcase on the vehicle hood, said at least two fastening elements engage with said respective locking plates, each locking plate reaching under the detent nose and at least one lateral area of the stepped surface.

5. The arrangement according to claim 1, wherein each of said locking plates is arrangeable on an end side of an insertion channel in a bottom surface of the suitcase, said channel corresponding approximately to the oblong shape of a respective one of said two fastening elements; and wherein in a holding condition, a base surface of said channel is configured to rest on the supporting surface of the fastening element.

6. The arrangement according to claim 2, wherein each of said locking plates is arrangeable on an end side of an insertion channel in a bottom surface of the suitcase, said channel corresponding approximately to the oblong shape of a respective one of said two fastening elements; and wherein in a holding condition, a base surface of said channel is configured to rest on the supporting surface of the fastening element.

* * * * *